United States Patent [19]

Thompson et al.

[11] Patent Number: 5,513,726

[45] Date of Patent: May 7, 1996

[54] BRAKE LINING WEAR INDICATOR ASSEMBLY

[75] Inventors: Richard E. Thompson, Cwmbran; Anthony J. Williams, Pontypool; Kieron B. O. Brooks, Newbridge, all of United Kingdom

[73] Assignee: Lucas Industries Public Limited Company, Solihull, England

[21] Appl. No.: 478,793

[22] Filed: Jun. 7, 1995

Related U.S. Application Data

[63] Continuation of Ser. No. 166,733, Dec. 15, 1993, abandoned.

[30] Foreign Application Priority Data

Dec. 15, 1992 [GB] United Kingdom .................... 9226078
Feb. 6, 1993 [GB] United Kingdom .................... 9302348

[51] Int. Cl.$^6$ ................................................. F16D 66/02
[52] U.S. Cl. ........................................ 188/1.11; 340/454
[58] Field of Search ..................... 188/1.11 W, 1.11 WE, 188/1.11 E; 116/208; 340/454

[56] References Cited

U.S. PATENT DOCUMENTS

| 4,183,012 | 1/1980 | Kimura ................................ 188/1.11 X |
| 4,290,514 | 9/1981 | McConnell et al. ................. 340/454 X |
| 4,677,420 | 6/1987 | Topic et al. ......................... 188/1.11 X |
| 4,742,326 | 5/1988 | Gregoire et al. .................... 188/1.11 X |
| 4,890,697 | 1/1990 | Fischer et al. ...................... 188/1.11 |

FOREIGN PATENT DOCUMENTS

| 0190705 | 8/1986 | European Pat. Off. . |
| 2827035 | 2/1979 | Germany . |
| 1582567 | 1/1981 | United Kingdom ............. 188/1.11 |
| 2231928 | 11/1990 | United Kingdom . |

OTHER PUBLICATIONS

Two photocopies depicting prior art device for mounting the cables and sensors of a brake lining wear indicator.

Primary Examiner—David M. Mitchell
Assistant Examiner—Kevin D. Rutherford
Attorney, Agent, or Firm—Jacobson, Price, Holman & Stern

[57] ABSTRACT

A brake lining wear indicator assembly includes a cable (9) having a wear sensor (8) adjacent one end thereof for attachment to a friction lining (7) of a vehicle brake, and a connector (11) at its other end for connecting the sensor, in use, to a wear sensing and indicating circuit. A cable support device (10) extends between the sensor and connector and carries at least a part of the cable, being adapted for cooperation with part of the brake body to support the assembly in an operative position relative to the brake. The support device serves to protect the cable carried thereby from deleterious conditions arising during braking, the assembly forming a self-contained unit for attachment to the brake.

21 Claims, 3 Drawing Sheets

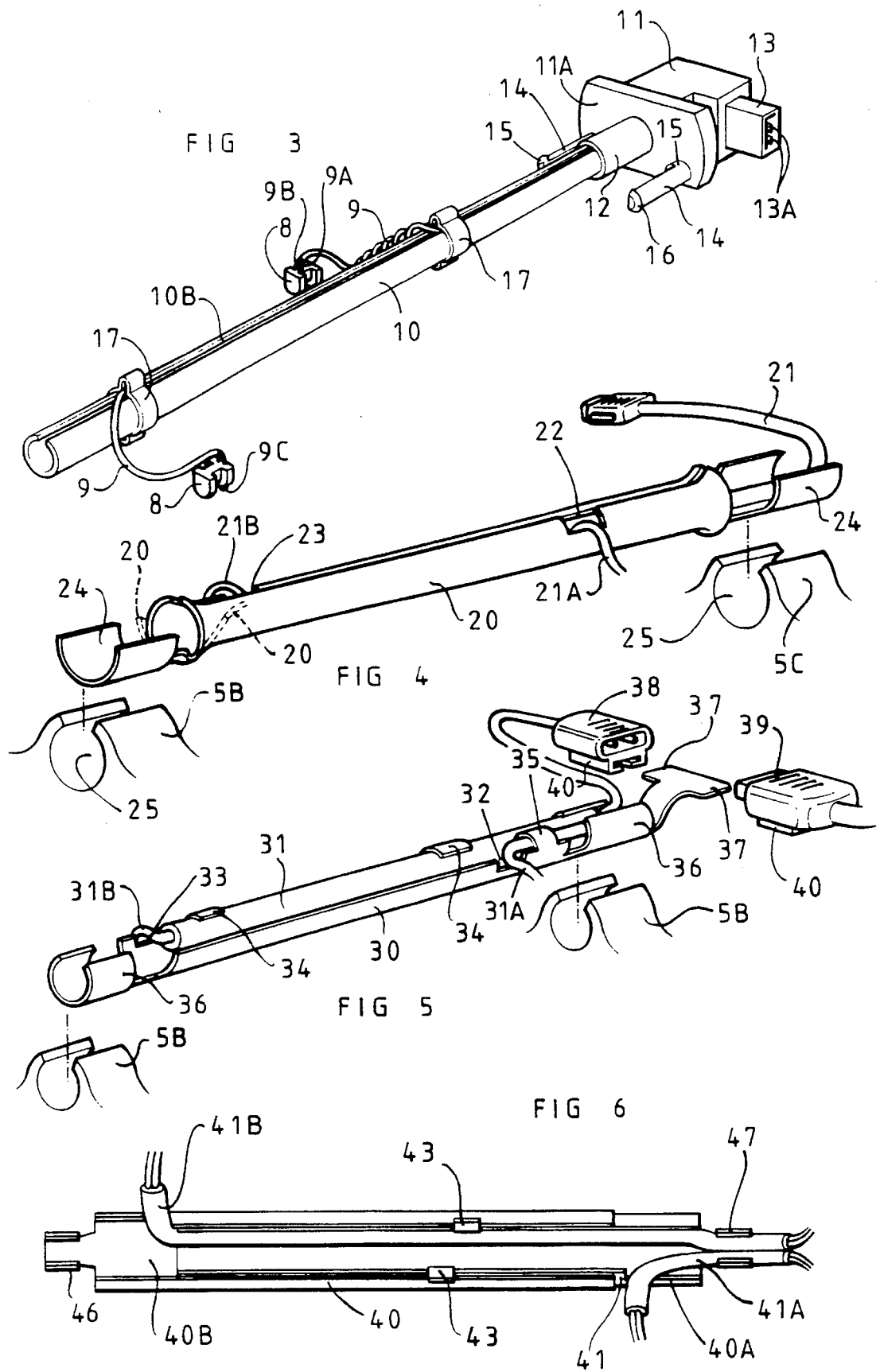

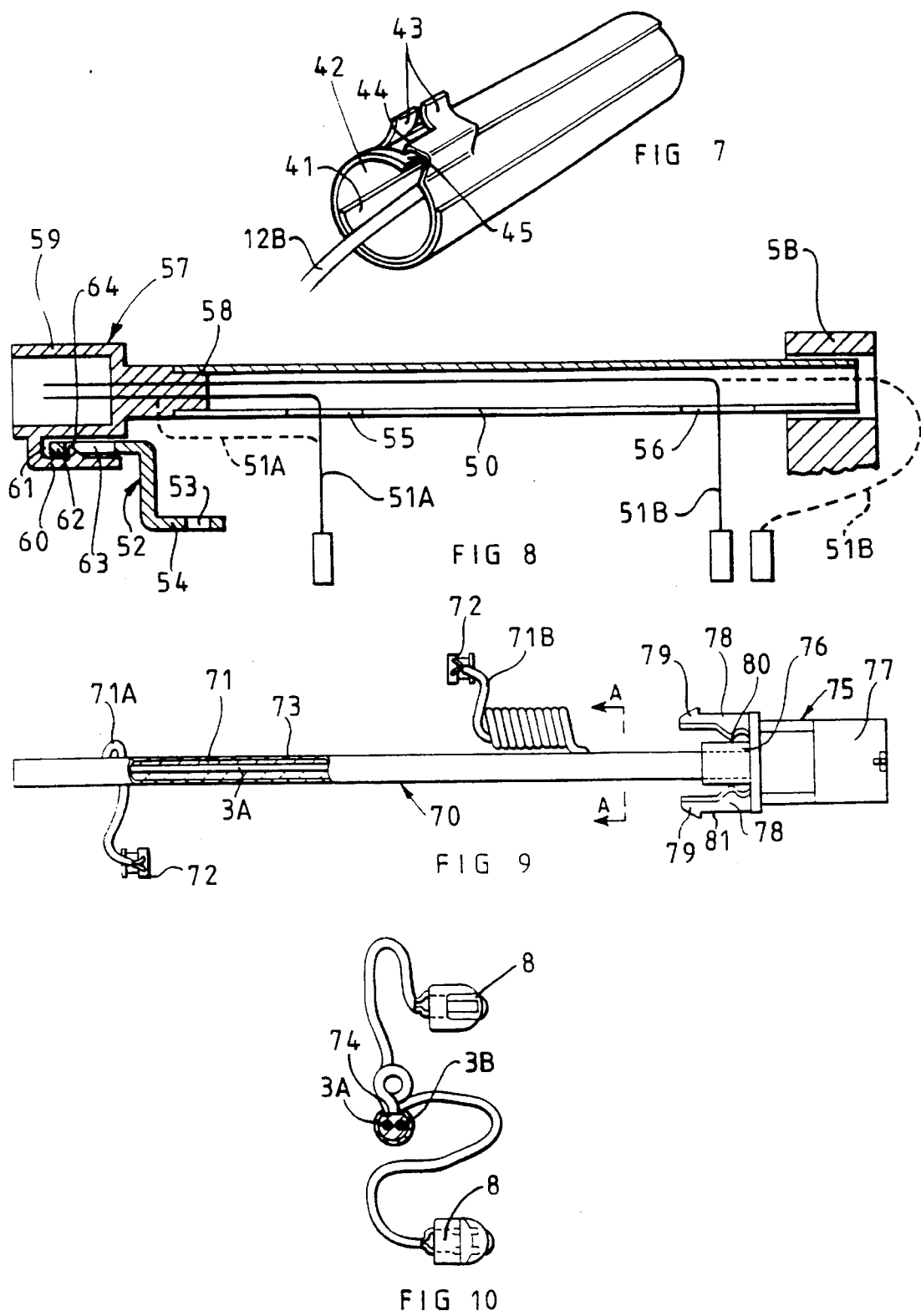

5,513,726

BRAKE LINING WEAR INDICATOR ASSEMBLY

This is a Continuation of application Ser. No. 08/166,733, filed Dec. 15, 1993 which was abandoned upon the filing hereof.

BACKGROUND OF THE INVENTION

This invention relates to a brake lining wear indicator assembly of the general kind including a cable having a wear sensor adjacent one end thereof for attachment to a friction lining of a vehicle brake and an electrical connector at its other end for connecting the sensor, in use, to a wear sensing and indicating circuit.

Wear indicator assemblies are sometimes subject, in use, to damage from the intense heat generated by the associated brake during braking and to contamination by lining dust or debris produced as the brake friction lining wears, as well as by externally generated foreign material such as road mud and dust. The cable of an assembly of the aforesaid kind is particularly vulnerable to damage when used in a disc brake, both by braking heat and by possible contact with the rotating brake disc, since it is often necessary for a cable to straddle the disc in order to provide a connection to one of the brake pads.

It is known to support a wear indicator cable across the disc of a disc brake by arranging it in a trough formed by a pad hold-down anti-rattle spring device spanning the disc and bolted to part of the brake housing. This arrangement leaves the cable relatively vulnerable to damage and is difficult to assemble on a brake production line.

BRIEF SUMMARY OF THE INVENTION

An object of the invention is to provide a brake lining wear indicator assembly in which the aforesaid difficulties are alleviated or avoided.

According to the invention, a brake lining wear indicator assembly of the aforesaid general kind includes a cable support device extending between the sensor and connector, the support device carrying at least a part of the cable and being adapted for cooperation with part of the brake body so as to support the assembly in an operative position relative to the brake with the support device serving to protect the cable carried thereby from deleterious conditions arising during braking, the assembly forming a self-contained unit for attachment to an assembled brake.

Preferably, the cable support device is in the form of an elongate trough or tube for housing one or more cables and having at least one portion adapted to engage within a hollow lug or the like on the brake structure.

When the cable support device is in the form of a tube, it may conveniently comprise inner and outer part-circular parts arranged so that, in one relative disposition of the parts they provide a longitudinally extending opening permitting passage of the cable therethrough, and in another relative disposition thereof they form a closed hollow section container for housing and protecting the cable. The device may incorporate means, such as a detent or the like, for locking the parts at least in their closed position.

In one convenient arrangement, the cable support device may include an elongate core of plastics or resin material containing the cable, the core being at least partially enclosed by a protective sheath, preferably of metal or plastics. The cable may conveniently be molded into the core and the core secured to or molded integrally with a connector device for connecting the wear indicator into an external circuit.

BRIEF DESCRIPTION OF THE DRAWINGS

The invention will now be described, by way of example, with reference to the accompanying drawings in wherein:

FIG. 3 is an enlarged perspective view of one embodiment of the wear indicator assembly of the invention;

FIG. 4 is a view similar to FIG. 3 of an alternative embodiment of the wear indicator assembly of the invention;

FIG. 5 is a view similar to FIGS. 3 and 4 of a further alternative embodiment of the invention;

FIG. 6 is a plan view of another embodiment of the invention;

FIG. 7 is an enlarged perspective view of part of the device of FIG. 6 illustrating a modification thereof;

FIG. 8 is a side view, partly in cross-section, of a further alternative embodiment of the wear indicator assembly of the invention;

FIG. 9 is a plan view of a further alternative embodiment of the wear indicator assembly of the invention, and FIG. 10 is a cross-sectional view taken along the line A—A of FIG. 9

DETAILED DESCRIPTION

Figure 1:
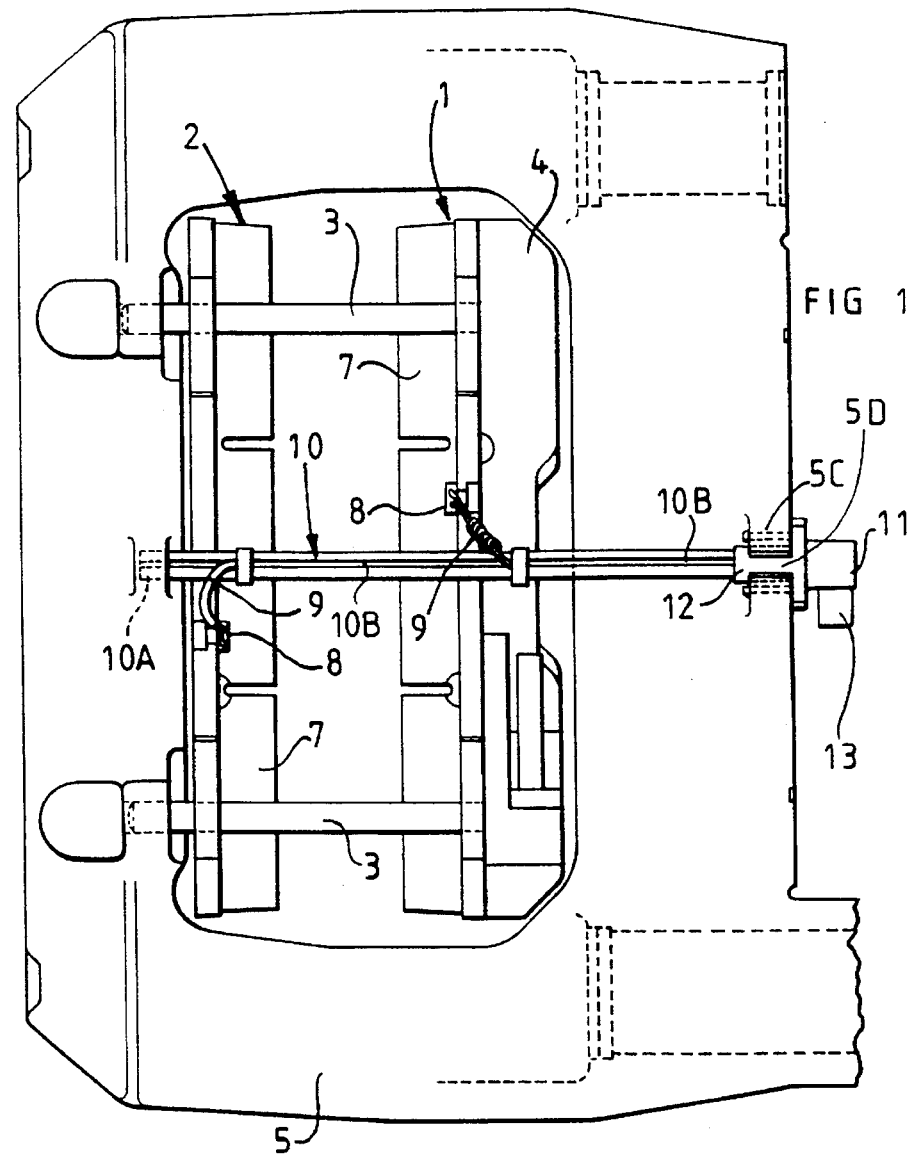
FIG. 1 is a top plan view of part of a vehicle disc brake incorporating the brake lining wear indicator assembly of the invention.
Figure 2:
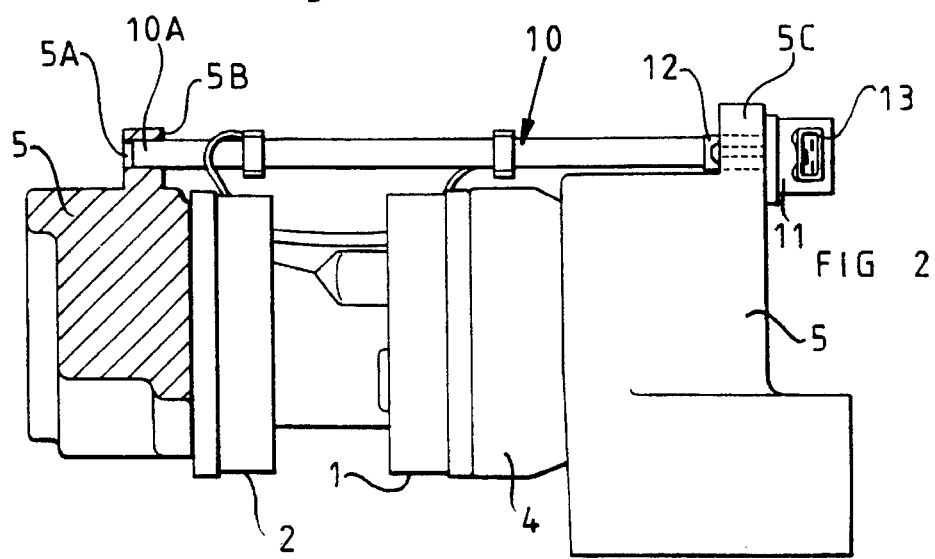
FIG. 2 is a side view partly in cross-section of the disc brake of FIG. 1.

The disc brake illustrated in FIGS. 1 and 2 includes a fixed carrier, (not shown) within which are mounted, at either side of a brake disc (not shown) a pair of friction pad assemblies 1, 2 supported by pins 3 extending axially of the disc. The brake incorporates hydraulic or mechanical actuating means which acts directly upon the pad assembly 1, via a spreader 4, to urge it, upon actuation, into braking engagement with the disc, the other pad assembly 2 being actuated indirectly by a caliper 5 slidably mounted relative to the carrier in conventional manner on pins fixed to the carrier, or alternatively slidable therein. Each pad assembly includes a friction lining 7 incorporating a respective wear sensor device 8, which is shown in greater detail in FIG. 3, the devices 8 being connected by a cable 9 to an electrical sensing and indicating circuit which is operable to provide a visible or audible signal to a driver that a brake pad is excessively worn and requires replacement. The cable 9 is housed within a cable support device 10 forming part of the wear indicator assembly and secured to the brake structure. The disc brake itself is of conventional construction and operation and requires no further description here.

In its form seen in FIGS. 1 to 3, the support device 10 is a cylindrical tube of uniform cross-section, of which an end portion 10A is received within a cylindrical through hole 5A in an upstanding lug 5B of the caliper. The tube has a longitudinal slot 10B over the whole of its length, for the purpose to be described. The other end portion of the tube is attached to an electrical connector 11, which has an integral boss 12 for insertion into a keyhole opening 5D formed in a further upstanding lug 5C of the caliper disposed opposite to the lug 5B. In this particular embodiment, the connector, of plastics material for example, is formed separately from the tube 10 and the boss 12 is provided with a suitably dimensioned bore within which the tube is received and secured, as by bonding for example. Alternatively, the connector may be molded onto the end portion of the tube. The connector 11 has a projecting socket 13 housing a pair of electrical connector pins 13A, the body being adapted to receive a complimentary plug which will be connected, in use to a wiring harness on a vehicle to which a brake carrying the wear indicator is fitted, thereby connecting the wear indicators 8 via the wiring harness to a sensing circuit of the vehicle. The socket 13 may be mounted and fixed within the connector 11, or the latter may be molded onto the body of the socket. The connector 11 is provided with a pair of arms 14 disposed to either side of the boss 12 and projecting generally parallel to the tube 10, the arms being conveniently molded integrally with the connector 11. Each arm 14 is generally semi-cylindrical and extends from a short cylindrical boss 15 projecting from the forward face 11A of the connector. Each arm 14 is provided at its free end with an outwardly projecting nib 16 to act as a locking device, in the manner to be described. The cable 9 is anchored within the connector 11 and connected to the pins 13A. The cable consists of a pair of leads 9A, 9B contained within an outer sheath and being arranged to form a pair of loops 9C which terminate respectively at the sensor devices 8. Each loop 9C extends within its associated sensor device so as to lie, in use, within the friction lining of one of the pad assemblies and be worn away, when maximum friction lining wear has taken place, to provide an electrical contact with the brake disc and a consequent excessive wear warning signal, as will be understood by those versed in the art. The cable 9 is laid along the interior of the tube 10, entering via the slot 10B, the lengths of the loops being such that the sensor devices lie adjacent the respective friction pad assemblies without excessive cable being present. After insertion of the cable within the tube 10, retainers 17 are placed around the tube and crimped in position, serving the dual purpose of retaining the cable within the tube and setting the respective locations at which the cable emerges for connection to the friction pad assemblies.

In order to install the wear indicator assembly on the brake, a portion of the tube adjacent the boss 12 of the connector 11 is pressed through the narrow part of the keyhole opening 5D in the lug 5C and resiliently recovers within the larger portion of the slot. The free end portion of the tube 10 is then passed through the lug 5C and moved longitudinally until its free end portion 10A engages within the opening 5A of the opposite lug 5B, the boss 12 of the connector 11 simultaneously entering the corresponding opening in the boss 5C. At the same time, the arms 14 enter openings formed in the boss 5C at either side of and parallel to the opening receiving the boss 12. Continued movement of the assembly in the same direction causes slight inward stressing of the arms as the nibs 16 travel against the walls of their openings and the arms resiliently recover outwardly, upon emergence of the nibs at the far side of the lug 5C, causing the nibs to engage behind the then adjacent face of the lug to retain the indicator assembly in position on the brake. The assembly may be removed, when required, by inwardly depressing the arms to free the nibs and exerting first an axial pull on the connector 11 to remove the tube from the lug 5B, and then a radial pull to remove the tube through the narrow part of the keyhole opening 5D.

FIG. 4 illustrates another embodiment of the wear indicator assembly of the invention. The support device 20 of the assembly is of generally cylindrical tubular form and receives through one end thereof a cable 21, of which the individual portions 21A, 21B form a pair of loops as described previously. One of the cable portions 21A emerges from the tube via a first slotted opening 22 close to one end of the tube. The other cable portion 12B is run along the tube and emerges through a slotted opening 23 adjacent the other end of the tube.

Initially, the support device 20 of spring steel or other resilient material, is in the form of an open trough as indicated by the dotted lines in FIG. 4, but is deformed into the tubular form illustrated, after the cable has been laid therein, in order substantially to enclose the latter. The extreme end portions 24 of the device are of generally part-cylindrical form and are left undeformed until it is required to attach the device to the lugs 5B, 5C of the brake which, for this embodiment, are provided with keyhole through-openings 25. In order to mount the device on the brake, the portions 24 are deformed sufficiently to enable them to pass through the narrower portions of the openings 25, whereupon they resiliently recover within the openings in order to secure the device firmly on the brake. The wear sensors at the free ends of the leads 21A, 21B may then readily be connected to the pad assemblies in the brake. It will be seen that portions of the device 10 inwardly of the portions 24 are outwardly flared so that they cooperate with the lugs 5B, 5C to limit longitudinal movement of the device, when installed.

The device in FIG. 5 is generally similar to that of FIG. 4, except that it forms an open trough, within which is mounted a sleeve 31 housing the cable portion 31B which extends along the length of the trough to emerge through a slot 33, as before. The sleeve 31, which may be longitudinally split to facilitate insertion of the cable portion, is held in position by bent-over tags 34 provided at intervals along the trough. The other cable portion 31A runs along the outside of the sleeve 31 for a short distance and emerges through a slot 33, this cable portion being clamped in position by a further tongue 35 adjacent one end of the trough. Part-cylindrical end portions 36 of the trough again serve to mount the support device within lugs 5B, 5C on the body of the brake by snap-engagement, as described above. One end of the assembly forms a pair of tabs 37 serving to support respective connectors 38, 39 which plug one within the other when mounted on the tabs by way of mounting formations 40 on the connectors. The plug 38 is connected to the sensors via the cable loops and the plug 39 is connected in use, to a wiring loom of a vehicle connecting it, in turn, to a sensing circuit therein.

In the alternative embodiment illustrated in FIGS. 6 and 7, the cable support 40 is composed of inner and outer components 41, 42, each of generally part-circular cross-section. The components may be relatively rotated between two extreme positions, of which a first is represented in FIG. 6 with the inner component rotated so as to lie wholly within the outer component, or substantially so. This creates a trough within which the cable portions 41A, 41B are laid, with the respective cable portions emerging through slots 40A, 40B towards each end of the assembly. Each of the components 41, 42 is provided with a respective tag 43 to which force may be applied manually in order to rotate the components to a second extreme position in which they form together a closed tube housing the cable portions. FIG. 7 illustrates part of the device in its closed position, the components 41 and 42 being formed, in the region of the tabs 43, with a locking detent. This is formed, in the embodiment described, by a resilient tongue 44 on one of the components which snap engages behind a rib 45 formed on the other component in order to lock the components together in their closed position in a releasable manner. It will be understood that any convenient form of alternative or additional locking means may be used. End portions 46, 47 of the device (FIG. 6) are provided, as previously, for snap-engagement with lugs on the brake body, although alternative fixing means may be employed, depending on the type of lug used.

FIG. 8 illustrates an alternative embodiment intended to be mounted partly on an apertured lug 5B of the brake and partly on a bracket 52 intended to be secured to the body of the brake by screws or bolts (not shown) passing through a hole 53 in an arm 54 of the bracket. In this embodiment, the body 50 is formed as a plain or wrapped tube, with the cable portions 51A, 51B emerging through slots 55, 56 formed in the wall of the device 50 at appropriate locations for connection to the friction element sensors, in use. Alternative routes for the cable portions 51A, 51B are illustrated in broken lines. The left hand end of the body 50 is closed by means of an end piece 57, part of which forms a plug 58 for insertion into the open end of the tube. A larger diameter portion 59 of the device is hollow and may be adapted to form a connector which would receive a plug in use connecting the cable portions 51A, 51B to the sensing circuit. The portion 59 of the device is provided with an external flange 60 arranged to form, with the external surface of the portion 59, a cavity 61 to receive a further arm 62 of the bracket 52 extending parallel to the arm 54. The arm 62 is slotted at 63, enabling a detent 64 to snap engage therein when the bracket portion 62 is inserted into the cavity 61. In order to assemble the device 50 onto the brake, the right hand end of the device is slid into the lug 5B simultaneously with the tongue 62 entering the cavity 61, the device being retained axially in opposed directions by the detent 64 engaged in the slot 63 and the closed end of the cavity 60.

A further alternative embodiment of the wear indicator assembly of the invention is illustrated in FIGS. 9 and 10 and includes a cable support device 70 having a generally cylindrical solid core 71 of plastics material surrounding a pair of cable portions 71 A, 71B having respective wear indicator devices 72 for connection, in use, to a pair of brake pads of a disc brake (not shown). The core 71 is preferably of plastics material and may conveniently be molded around the cable portions, or alternatively provided with grooves or through holes through which the cable portions may subsequently be passed to emerge at spaced locations along the support device, as illustrated. The core 71 is surrounded by a protective sheath 73 of thin-gauge material such as metal or hard plastics material, the sheath being apertured at the appropriate places to permit exit of the cable portions 71A, 71B from the support device 70, one of the apertures being illustrated at 74 in FIG. 10. Alternatively, the apertures may be replaced by a longitudinal slot extending over the whole or part of the length of the sheath.

The cable support 70 is attached to an electrical connector, indicated generally at 75, which has an integral cylindrical boss 76 for insertion into a fixed part of a brake, in the manner to be described. The connector 75 may conveniently be formed integrally with the core 71 of the cable support, although it would be possible for the connector to be formed separately and the boss 76 to be provided with a suitably dimensioned bore, within which the cable support is received and secured. The connector 75 has a generally oval body 77 housing a pair of electrical connector pins, the body being adapted to receive a complementary plug which would be connected, in use, to a wiring harness on a vehicle to which a brake carrying the wear indicators is fitted, thereby connecting the wear indicators 8 via the wiring harness to a sensing circuit of the vehicle. The connector 75 is provided with a pair of arms 78 extending in the direction of and parallel to the cable support 70, the arms being molded integrally or formed separately and attached later. Each arm 78 is provided with an outwardly projecting nib 79 at its free end and a curvate internal protrusion 80 on its internal surface.

The wear indicator assembly is installed on a brake by moving it longitudinally to engage the free end of the cable support 70 and the cylindrical boss 76 within cylindrical holes formed respectively in longitudinally spaced fixed lugs (not shown) of the brake, the arms 78 being inserted through respective further holes in the adjacent one of the lugs, generally as described in relation to FIG. 1. Each arm deflects slightly inwardly during its passage through the corresponding hole and resiliently recovers once the rib emerges to bring the rib closely behind an external surface of the lug and so limit movement of the connector in the withdrawal direction. The internal protrusion 80 and the outwardly facing side 81 of the arm lie respectively against opposed surface portions within the hole to provide support for the arm therein.

In order to remove the wear indicator from the brake body, the arms 78 may be inwardly pressed to release the ribs 79 and permit withdrawal of the arms from the body. As the arms flex inwardly, they fulcrum on the curved protrusions 80 against the adjacent surface of the hole.

It will be understood that the wear indicator of the invention may take many different forms and the various features illustrated may be used in different combinations in different embodiments. It is advantageous in that it may be pre-assembled and stored as a self-contained unit until needed on a production line and then readily assembled into a brake. It is then a simple matter to attach the wear sensors into the linings and plug the leads into the sensing circuit via the vehicle wiring loom.

We claim:

1. A brake lining wear indicator assembly for a vehicle brake having a brake body and friction element mounted on said brake body, comprising:

cable means having a pair of wear sensors operatively connected to and in relative spaced relationship along said cable means, said sensors being attachable to respective friction elements of said brake;

an electrical connector operatively connected to said cable means for connecting said sensors to a brake wear sensing and indicating circuit;

a cable means support device supporting at least the part of said cable means having said sensors thereon for protecting said cable means from deleterious conditions arising during operation of said brake; and support means on said brake body for supporting said support device so that said cable means is supported in an operating position relative to said brake with each sensor disposed to be readily attachable to an associated friction element, said assembly being a self-contained unit attachable to said brake wherein:

said cable means support device comprises an elongate member predominately tubular shaped in cross-section;

said cable means comprises at least one cable at least partly housed in said elongate member;

said support means comprises hollow lug means on said brake body; and said elongate member has at least one portion thereon adapted to engage within said hollow lug means.

2. The assembly as claimed in claim 1 wherein said cable means support device comprises:

an outer part having a part-circular cross-sectional shape; and an inner part having a part-circular cross-sectional shape and being relatively moveably disposed in said outer part so that, in one relative position said parts provide a longitudinally extending opening to facilitate passing of said cable means therethrough, and in a closed relative position said inner and out parts form a closed hollow container for housing and protecting said cable means.

3. The assembly as claimed in claim 2 and further comprising:

locking means on said cable means support device for locking said inner and outer parts in said closed position.

4. The assembly as claimed in claim 1 and further comprising:

at least one opening in said brake body; and at least one resilient attaching means on said cable means support device for snap-engagement in said at least one opening in said brake body for retaining said assembly on said brake body.

5. A brake lining wear indicator assembly for a vehicle brake having a brake body and friction elements mounted on said brake body, comprising:

cable means having a pair of wear sensors operatively connected to and in relative spaced relationship along said cable means, said sensors being attachable to respective friction elements of said brake;

an electrical connector operatively connected to said cable means for connecting said sensors to a brake wear sensing and indicating circuit;

a cable means support device supporting at least the part of said cable means having said sensors thereon for protecting said cable means form deleterious conditions arising during operation of said brake;

support means on said brake body for supporting said support device so that said cable means is supported in an operating position relative to said brake with each sensor disposed to be readily attachable to an associated friction element, said assembly being a self-contained unit attachable to said brake;

at least one opening in said brake body; and at least one resilient attaching means on said cable means support device for snap-engagement in said at least one opening in said brake body for retaining said assembly on said brake body.

6. The assembly as claimed in claim 5 wherein:

said resilient attaching means is disposed on said electrical connector.

7. The assembly as claimed in claim 6 wherein:

said cable means support device has a free end;

said at least one opening said brake body comprises a pair of openings in said brake body; and said at least one resilient attaching means comprises a pair of relatively spaced resilient arms extending towards said free end of said cable means support device, and snap-engaging means on said arms for engagement within said pair of openings for retaining said assembly on said brake body.

8. A brake lining wear indicator assembly for a vehicle brake having a brake body and friction elements mounted on said brake body, comprising:

cable means having a pair of wear sensors operatively connected to and in relative spaced relationship along said cable means, said sensors being attachable to respective friction elements of said brake;

an electrical connector operatively connected to said cable means for connecting said sensors to a brake wear sensing and indicating circuit;

a cable means support device supporting at least the part of said cable means having said sensors thereon for protecting said cable means for deleterious conditions arising during operation of said brake;

support means on said brake body for supporting said support device so that said cable means is supported in an operating position relative to said brake with each sensor disposed to be readily attachable to an associated friction element, said assembly being a self-contained unit attachable to said brake, wherein said cable means support device comprises:

an elongate core member containing said cable means and having a predominately tubular cross-section; and a protective sheath at least partly enclosing said core member.

9. The assembly as claimed in claim 8 wherein:

said cable means is molded into said core; and said core is secured to said electrical connector.

10. The assembly as claimed in claim 9 wherein:

said core is molded integrally with said electrical connector.

11. A vehicle brake comprising:

a brake body;

friction elements mounted on said brake body; and a brake lining wear indicator assembly, comprising:

cable means having a pair of wear sensors operatively connected to and in relative spaced relationship along said cable means, said sensors being attachable to respective friction elements of said brake;

an electrical connector operatively connected to said cable means for connecting said sensors to a brake wear sensing and indicating circuit;

a cable means support device supporting at least the part of said cable means having said sensors thereon for protecting said cable means form deleterious conditions arising during operation of said brake said cable means support device having a predominately tubular cross-section;

support means on said brake body for supporting said support device so that said cable means is supported in an operating position relative to said brake with each sensor disposed to be readily attachable to an associated friction element, said assembly being a self-contained unit attachable to said brake, wherein said wear sensors are attached to said friction elements.

12. A brake lining wear indicator assembly for a vehicle brake having a brake body and friction elements mounted on said brake body, comprising:

cable means having a pair of cable end portions and a separate wear sensor operatively connected to each one of said pair of cable end portions in relative spaced relationship along said cable means, each of said sensors being attachable to a respective one of said friction elements of said brake;

an electrical connector operatively connected to said cable means for connecting said sensors to a brake wear sensing and indicating circuit;

a cable means support device supporting at least the part of said cable means having said sensors thereon for protecting said cable means from deleterious conditions arising during operation of said brake;

a longitudinal slot extending over at least a major part of the length of said cable means support device;

a plurality of cable retainers mounted in spaced relationship along said longitudinal slot, said cable end portions extending outwardly through said slot at positions determined by said spaced cable retainers to facilitate engagement of a respective sensor on each cable end portion with a respective brake friction element; and support means on said brake body for supporting said support device so that said cable means is supported in an operating position relative to said brake with each sensor disposed to be readily attachable to an associated friction element, said assembly being a self-contained unit attachable to said brake.

13. The assembly as claimed in claim 12 and further comprising:

at least one opening in said brake body; and at least one resilient attaching means on said cable means support device for snap-engagement in said at least one opening in said brake body for retaining said assembly on said brake body.

14. The assembly as claimed in claim 13 wherein:

said resilient attaching means is disposed on said electrical connector.

15. The brake lining wear indicator assembly as claimed in claim 12 wherein:

said cable end portions extend outwardly through said slot at respective positions adjacent said spaced cable retainers.

16. A brake lining wear indicator assembly for a vehicle brake having a brake body and friction elements mounted on said brake body, comprising:

cable means having a pair of cable end portions and a separate wear sensor operatively connected to each one of said pair of cable end portions in relative spaced relationship along said cable means, each of said sensors being attachable to a respective one of said friction elements of said brake;

an electrical connector operatively connected to said cable means for connecting said sensors to a brake wear sensing and indicating circuit;

a cable means support device supporting at least the part of said cable means having said sensors thereon for protecting said cable means for deleterious conditions arising during operation of said brake;

spaced openings in said cable means support device, each one of said pair of cable end portions extending outwardly through a respective one of said spaced openings to facilitate engagement of a respective sensor on each cable end portion with a respective friction element;

support means on said brake body for supporting said support device so that said cable means is supported in an operating position relative to said brake with each sensor disposed to be readily attachable to an associated friction element, said assembly being a self-contained unit attachable to said brake;

at least one opening in said brake body; and at least one resilient attaching means on said cable means support device for snap-engagement in said at east one opening in said brake body for retaining said assembly on said brake body.

17. The assembly as claimed in claim 16 wherein:

said resilient attaching means is disposed on said electrical connector.

18. The assembly as claimed in claim 17 wherein:

said cable means support device has a free end;

said at least one opening in said brake body comprises a pair of openings in said brake body; and said at least one resilient attaching means comprises a pair of relatively spaced resilient arms extending towards said free end of said cable means support device, and snap-engaging means on said arms for engagement within said pair of openings for retaining said assembly on said brake body.

19. A brake lining wear indicator assembly for a vehicle brake having a brake body and friction elements mounted on said brake body, the body also having support means for attaching the assembly to the brake, said assembly comprising:

cable means including a pair of cable portions, each cable portion carrying and being operatively connected to a respective wear sensor, each wear sensor being relatively space along said cable means and attachable to respective friction elements of the brake;

an electrical connector operatively connected to said cable means for connecting said sensors to a brake wear sensing and indicating circuit;

an elongate cable means support device having a hollow portion housing therein at least substantial part of said cable portions having said sensors thereon in order to protect said cable portions from deleterious conditions arising during operation of the brake, said assembly formed by the cable means, electrical connector and cable means support device being a permanently mutually inseparable self-contained unit attachable to said support means of the brake body so as to be supported relative to the brake in an operating position in which said assembly bridges across the friction element with the cable portions disposed so that the sensors are positioned to be readily attachable respectively to the friction elements.

20. The assembly as claimed in claim 19, wherein said hollow portion extends from a first mounting means of the support device serving for attachment to said support means at one side of the friction elements, to a second remote mounting means serving for attachment to said support means at another side of the friction element, said hollow portion having spacing means between said mounting means, said spacing means serving to set locations at which the cable means extends from the support device for attachment of each wear sensor respectively to one of said friction elements.

21. The assembly as claimed in claim 19, wherein said cable means support device is at least partly tubular-shaped in cross section, and said support means comprises hollow lug means on said brake body, and said elongate member has at least one portion thereon adapted to engage with said hollow lug means.

\* \* \* \* \*